United States Patent [19]

Sonobe

[11] Patent Number: 5,389,826

[45] Date of Patent: Feb. 14, 1995

[54] VARIABLE CLOCK DIVIDING CIRCUIT

[75] Inventor: Satoru Sonobe, Tokyo, Japan

[73] Assignee: NEC Corporation, Tokyo, Japan

[21] Appl. No.: 912,753

[22] Filed: Jul. 13, 1992

[30] Foreign Application Priority Data

Jul. 11, 1991 [JP] Japan .................................. 3-170836

[51] Int. Cl.⁶ .............................................. H02B 1/00
[52] U.S. Cl. ..................... 307/125; 327/115; 327/141
[58] Field of Search .............. 307/112, 125, 239, 271, 307/440

[56] References Cited

U.S. PATENT DOCUMENTS

| | | | |
|---|---|---|---|
| 4,500,909 | 2/1985 | Machida | 358/17 |
| 4,801,875 | 1/1989 | Ige | 332/159 R |
| 5,043,596 | 8/1991 | Masuda et al. | 307/262 |

*Primary Examiner*—Jeffrey A. Gaffin
*Attorney, Agent, or Firm*—Sughrue, Mion, Zinn, Macpeak & Seas

[57] ABSTRACT

This variable clock dividing circuit is provided with a plurality of dividers coupled in succession. A first of the dividers divides the basic clock by a predetermined dividing ratio and provides an output clock signal to the next divider in succession, while the last divider receives an output clock signal from the next to last divider. The dividing circuit selectively outputs one of the output block signals from the dividers using a switching circuit. A phase synchronization circuit synchronizes the phase of the clock input to the plurality of dividers based on the basic clock. The phase synchronization circuit further comprises a buffer to delay the basic clock before inputting it to the first divider, and a plurality of AND gates. Each of the AND gates corresponds corresponds to the second to last dividers and receives the basic clock and the outputs from all the preceding dividers.

11 Claims, 6 Drawing Sheets

20 PHASE SYNCHRONIZATION CIRCUIT

VARIABLE CLOCK DIVIDING CIRCUIT

BACKGROUNDS OF THE INVENTION

1. Field of the Invention

This invention relates to a variable clock dividing circuit capable stably of switching dividing clocks used in a microcomputer.

2. Description of the Prior Art

Many conventional microcomputers, in particular, single-chip microcomputers provided with peripheral circuits, have a built-in variable clock dividing circuit to switch the system clock frequency corresponding to an application being run by the microcomputer. Since the system clock affects the operation of the entire system, the variable clock dividing circuit of such system clock is required to be highly reliable.

A conventional variable clock dividing circuit comprises a plurality of dividers to divide the basic clock by different dividing ratios, and a switching circuit to select and output one of the clocks output from those plurality of dividers according to the dividing ratio setting signal. In such a conventional variable clock dividing circuit, since the output from a divider is continuously sent to the next input terminal of the divider on the next stage, delay at devices constituting a divider delays the change point of the output clock from the divider; the higher the stage of the divider, the larger the delay from the basic clock becomes.

For this reason, when switching from a certain divider clock to another divider clock, the cycle of the output clock immediately after switching changes by the delay of the divider, which might cause the frequency of the output clock to exceed the guaranteed operation frequency immediately after switching. This excess of the guaranteed operation frequency can cause malfunction of the system. This drawback is particularly prominent when the clock with a large dividing ratio is switched to that with a small dividing ratio due to a large delay.

SUMMARY OF THE INVENTION

An object of the present invention is to provide a variable clock dividing circuit capable of supplying stable clocks with extremely little disturbance in frequency even at switching of clock dividing ratios.

According to a preferred embodiment of the present invention to attain this object, a variable clock dividing circuit comprises a plurality of dividing means to branch the output of the previous dividing means for input to the next dividing means and divide the input clock by a certain dividing ratio. The circuit further comprises synchronizing means to synchronize the phase of the clocks input to those plurality of dividing means based on the basic clock, and switching means to selectively output one of the clocks output from those plurality of dividing means.

According to another preferred embodiment, the synchronizing means is provided with a plurality of AND gates, each corresponding to one of the dividing means, and inputs the basic clock and the outputs from all dividing means up to the previous stage to the AND gates.

Alternatively, the synchronizing means is provided with a plurality of AND gates, each corresponding to one of the dividing means and having the same number of input terminals, and inputs the basic clock and the outputs from all dividing means up to the previous stage to the AND gates and inputs common positive power to the remaining input terminals of the AND gates. Preferably, the number of input terminals in the AND gates is designed to be equal to the number of dividing means.

According to still another embodiment of the present invention, a variable clock dividing means comprises n dividing means including the first dividing means to divide the basic clock by a predetermined dividing ratio and the n-th dividing means to branch and input the output from the (n-1)th dividing means. The clock further comprises synchronizing means to synchronize the phase of the clock input to those plurality of dividing means based on the basic clock, and switching means to selectively output one of the clocks output from those plurality of dividing means.

According to still another embodiment, the synchronizing means comprises buffer means to input the basic clock with delay to the first dividing means and a plurality of AND gates each corresponding to one of the dividing means from the second to the n-th dividing means, and inputs the basic clock and the outputs from all dividing means up to the previous stage. The buffer means and a plurality of AND gates are preferably designed to have the same signal delay.

According to a further preferred embodiment, the synchronizing means is provided with a plurality of AND gates each corresponding to one of the dividing means and having the same number of input terminals and inputs the basic clock and the outputs from all the dividing means up to the previous stage to the AND gates, and inputs common positive power to the remaining input terminals of the AND gates. The number of input terminals at the AND gates is preferably designed to be the same as the number of dividing means.

Other objects, characteristics and effects of the present invention will be clarified in the detailed description below.

DESCRIPTION OF THE PREFERRED EMBODIMENT

Figure 1:
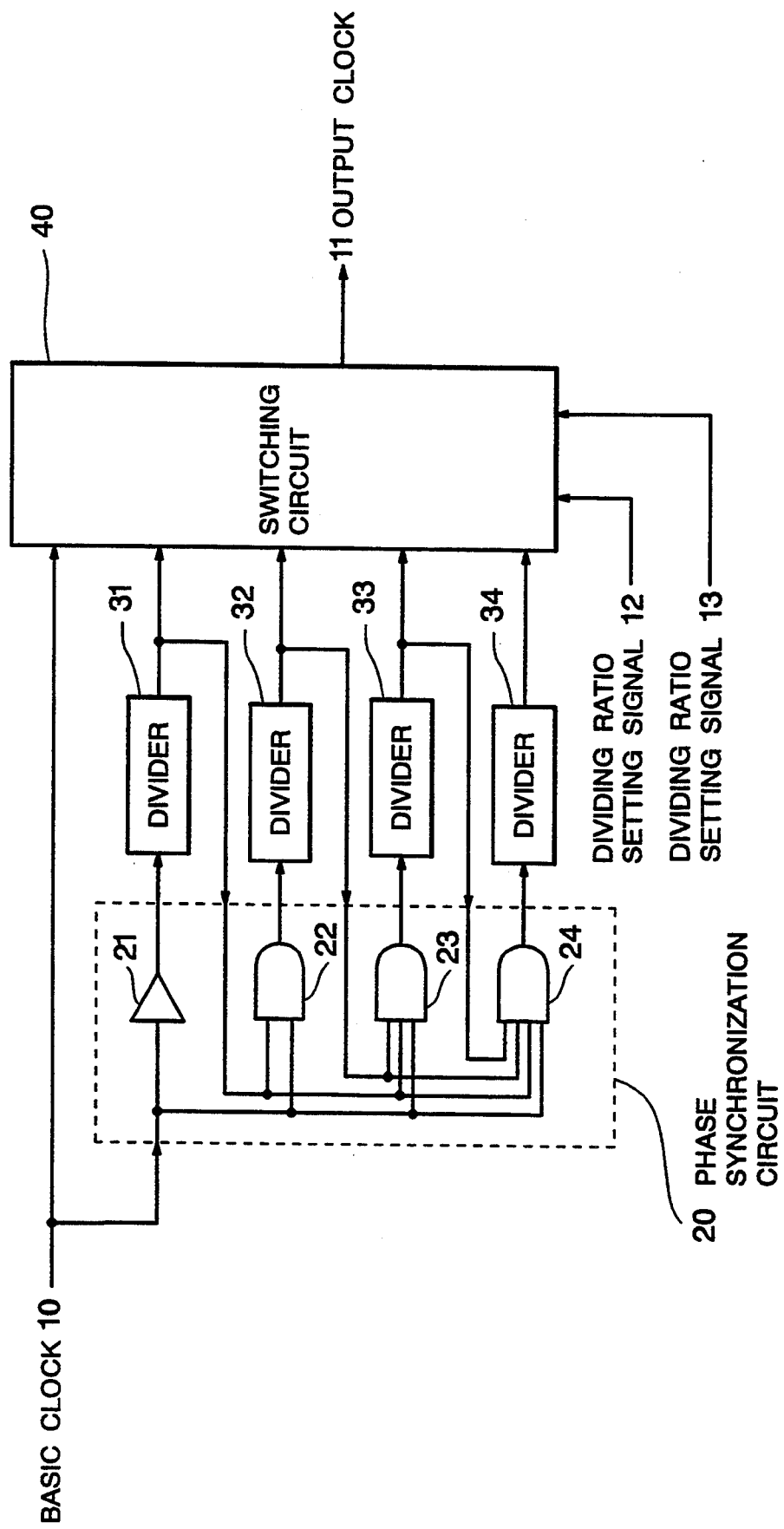
FIG. 1 is a block diagram to show the configuration of a variable clock dividing circuit according to a first embodiment of the present invention.

Referring to FIGS. 1 to 6, preferred embodiments of the present invention will be described. FIG. 1 shows the configuration of a variable clock dividing circuit according to an embodiment of the present invention. In FIG. 1, the variable clock dividing circuit according to this embodiment comprises dividers 31 to 34 which divide the frequency by two at the fall edge of the input clock, a phase synchronization circuit 20 which synchronizes the phase of the clock input to the dividers 31 to 34 based on the basic clock 10, and a switching circuit 40 which selects and outputs one of the clocks from the dividers 31 to 34. The phase synchronization circuit 20 has a buffer 21 and AND gates 22 to 24. The numeral 10 indicates the basic clock supplied by an oscillator, 11 indicates the output clock provided from the switching circuit 40 to a microprocessor or others, 12 and 13 indicate dividing ratio setting signals used for selection of a clock from those having the different dividing ratios output from the divider 31 to 34.

To the dividers 31 to 34, output signals from the buffer 21 in the phase synchronization circuit 20 and AND gates 22 to 24 are input respectively. To the phase synchronization circuit 20, the basic clock 10 and the output signals from the dividers 31 to 34 are input. The buffer 21 of the phase synchronization circuit 20 receives the basic signal 10 and provides an input clock signal to divider 31, the AND gate 22 receives the basic clock 10 and the output signals from the divider 31, and the AND gate 23 receives the basic clock 10 and the output signals from the dividers 31 and 32. The AND gate 24 receives the basic clock 10 and the output signals from the dividers 31 to 33. Therefore, the first divider 31 provides a clock representing ½ of the basic clock 10, the second divider 32 generates a clock representing ¼ of the basic clock 10, the third divider 33 provides a clock representing ⅛ of the basic clock 10, and the fourth divider 34 provides the clock representing 1/16 of the basic clock 10. To the switching circuit 40, the basic clock 10, output clocks from the dividers 31 to 34, and the dividing ratio setting signals 12 and 13 are input. The switching circuit 40 selects, according to a combination of two dividing ratio setting signals 12 and 13, one of the output signals from the dividers 31 to 34, and outputs it as the output clock 11. In addition, the clock switching at the switching circuit 40 is executed when the clock signals input from the dividers 31 to 34 are all at the low (L) level and the basic clock 10 rises to the high (H) level.

The buffer 21 in the phase synchronization circuit 20 is provided to set a certain delay value to the basic clock 10 input to the divider 31. The delay value at the buffer 21 is set to be the same as the delay values given by the AND gates 22 to 24. Since the AND gates 22 to 24 AND the output clocks from the dividers 31 to 33 and the basic clock 10, the clock with synchronized phase is input to the dividers 32 and 33.

Figure 2:
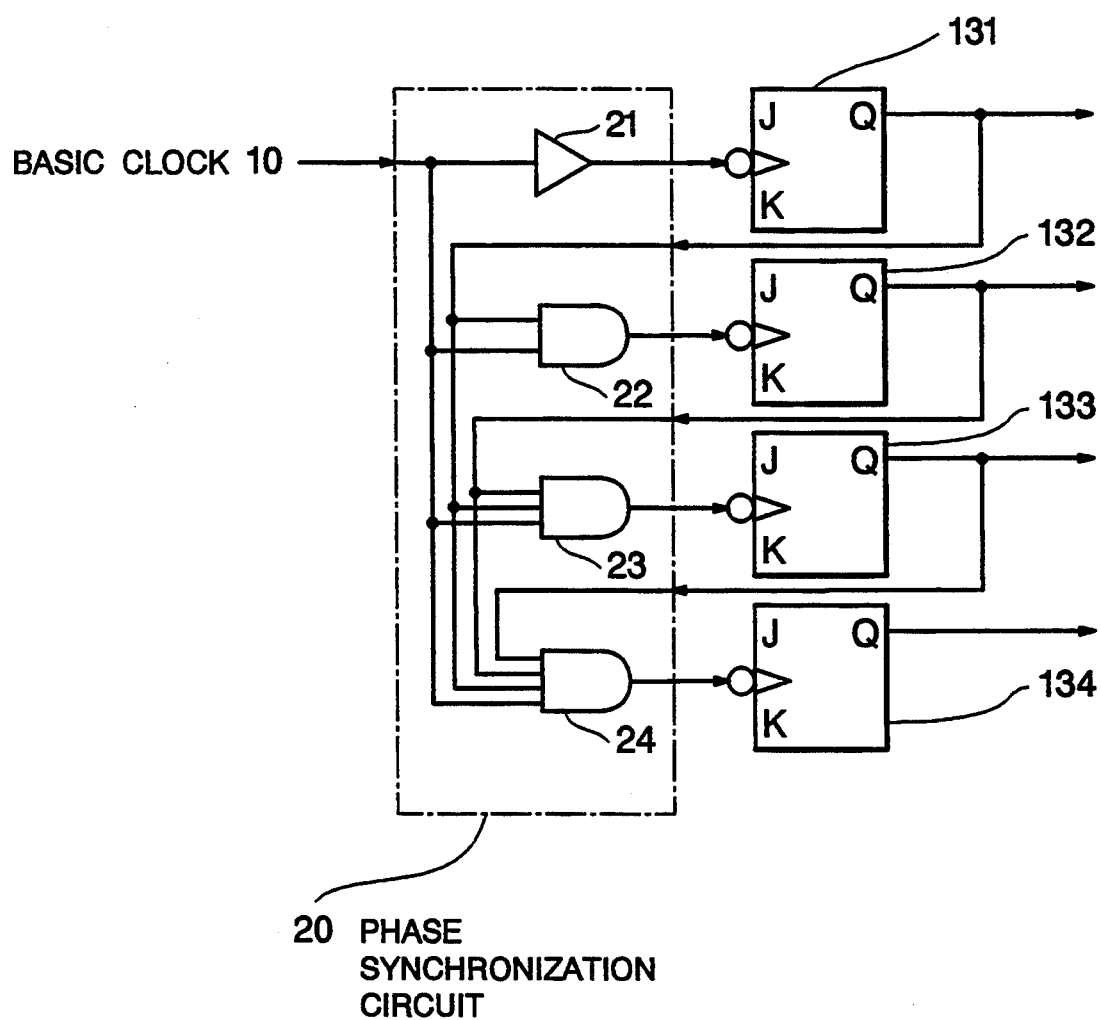
FIG. 2 is a schematic diagram to show a specific example of a divider for the variable clock dividing circuit as shown in FIG. 1.
Figure 3:
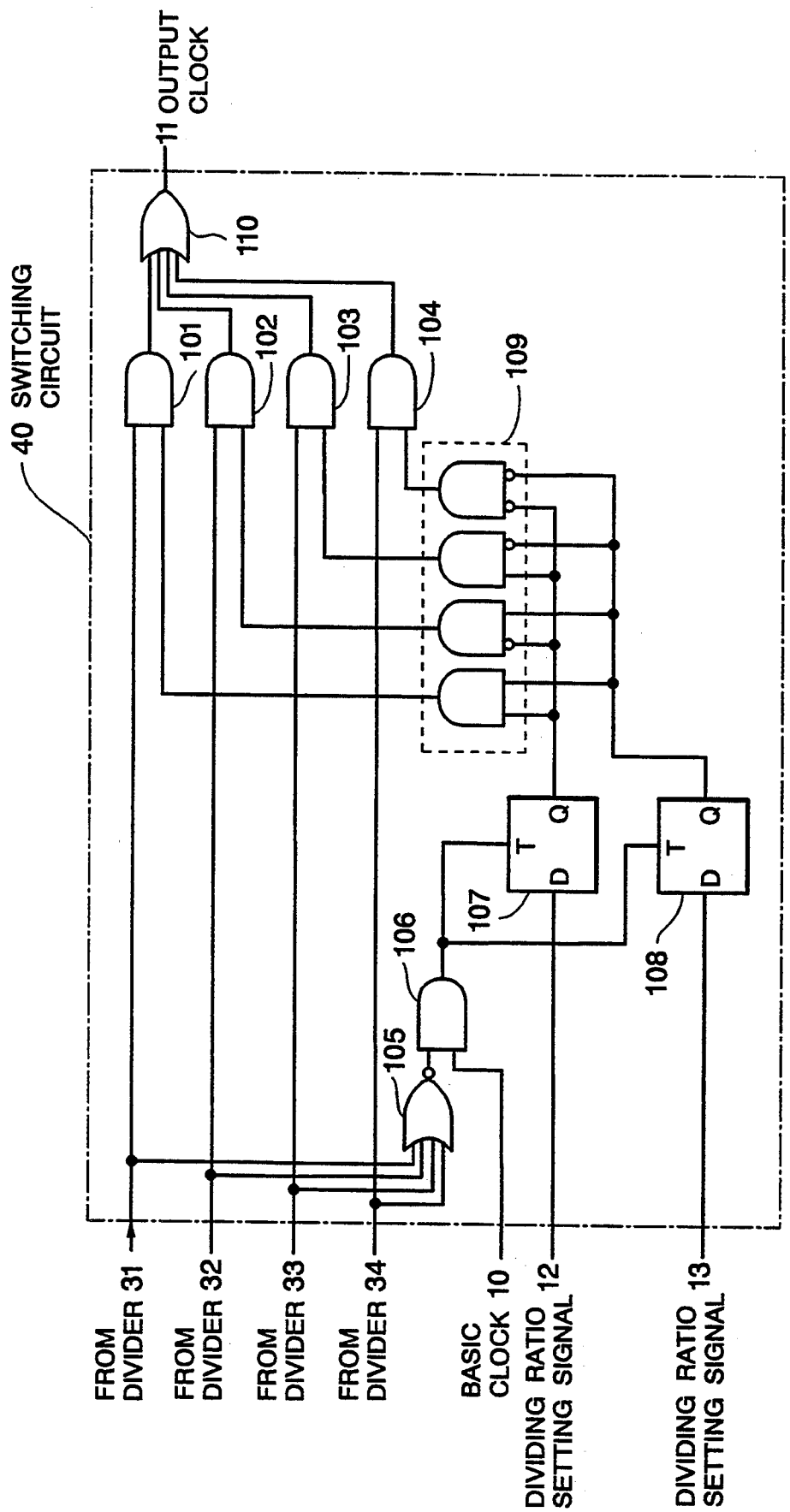
FIG. 3 is a schematic diagram to show a specific example of a switching circuit for the variable clock dividing circuit as shown in FIG. 1.

FIG. 2 shows a specific configuration example of the dividers 31 to 34. The dividers 31 to 34 consists of JK type flip-flops 131 to 134. FIG. 3 shows a specific configuration example of the switching circuit 40. In FIG. 3, the output clocks from the dividers 31 to 34 are input to AND gates 101 to 104 and a NOR gate 105. The output from the NOR gate 105 and the basic clock 10 are input to an AND gate 106. The dividing ratio setting signals 12 and 13 are input to D type latch circuits 107 and 108 respectively and the output from the AND gate 106 is input to the clock terminals at the D type latch circuits 107 and 108. The outputs from the D type latch circuits 107 and 108 are input to four AND gates at a decoding circuit 109. The output from this decoding circuit 109 is input to the AND gates 101 to 104. The outputs from the AND gates 101 to 104 are input to an OR gate 110 and the output clock 11 is output from the OR gate 110. In the configuration of the switching circuit 40 as shown in FIG. 3, as described later, output clock 11 is switched by dividing ratio setting signals 12 and 13 when the basic clock 10 rises to the H level (output at the AND gate 106 becomes high) with all the clock signals input from the dividers 31 to 34 at the L level. In other words, when the output at the AND gate 106 goes to the H level, change in dividing ratio setting signals 12 and 13 is output to the decoding circuit 109 via the D type latch circuits 107 and 108 and the output from that decoding circuit 109 selects one of the AND gates 101 to 104. This causes one of the clocks output from the dividers 31 to 34 to be selected, which is output from the OR gate 110 as the output clock 11.

Figure 4:
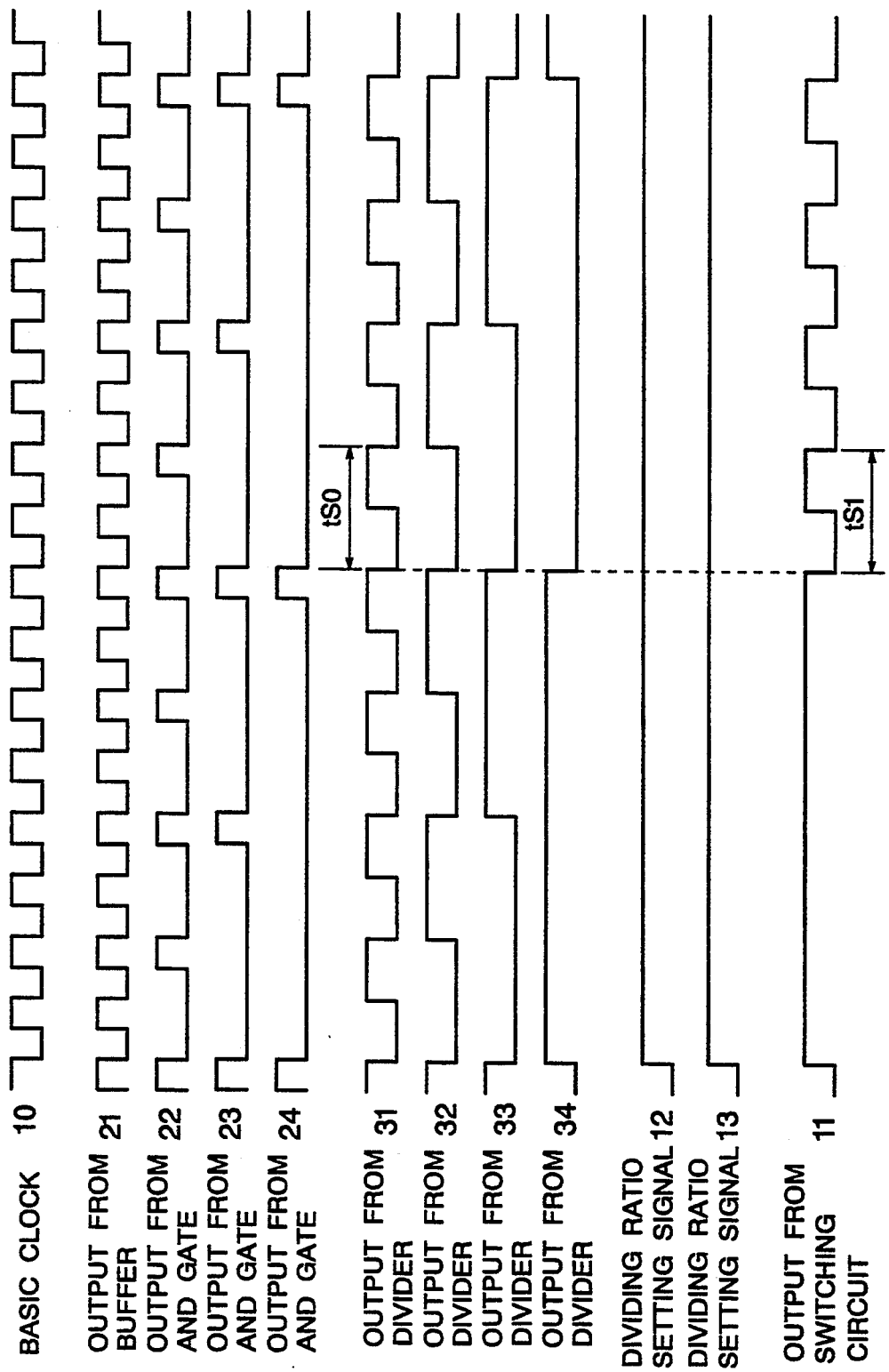
FIG. 4 is a timing chart to illustrate the operation of the variable clock dividing circuit as shown in FIG. 1.
Figure 5:
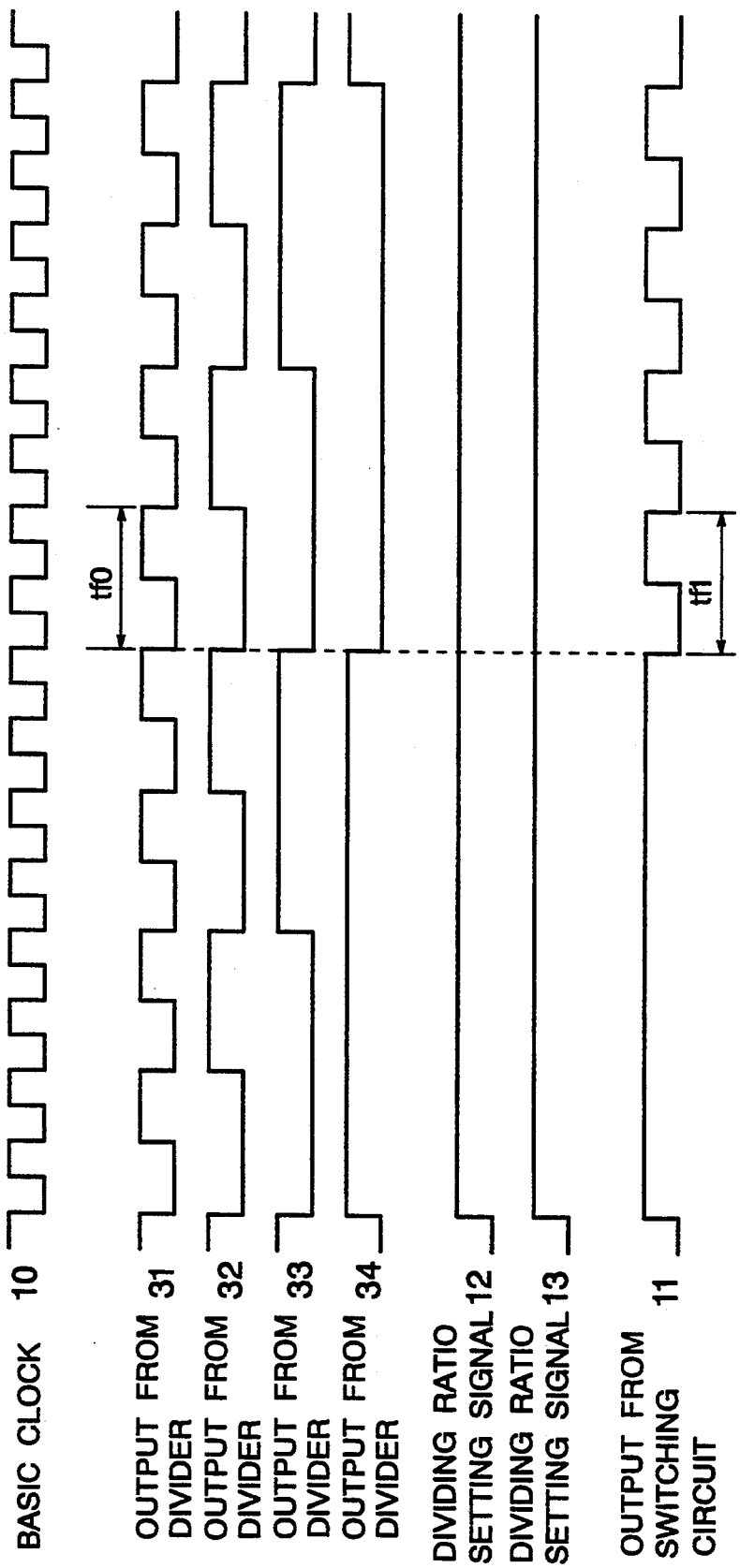
FIG. 5 is a timing chart to illustrate the operation when a phase synchronization circuit is not provided.

FIG. 4 is a timing chart to illustrate the operation of the variable clock dividing circuit as shown in FIGS. 1 to 3 above. This chart shows a case where the switching circuit 40 switches from the output from the divider 34 to the output from the divider 31, or switches the dividing ratio from 1/16 to ½ of the basic clock. Delays at the buffer 21 and the AND gates 22 to 24 cause the output clock signals of these devices (i.e. the clock signals input to the dividers 31 to 34) to delay from the basic clock 10 by the delay at the device. If the device structure is arranged so that the devices have the same driving capacity and the delays at the devices become equal, the waveform of the clock output from the dividers 31 to 34 becomes synchronized as shown in FIG. 5. Delay at the dividers 31 to 34 can be equalized by using the dividers having the same configuration (for example, a JK type flip-flop as shown in FIG. 2), and output signals from the dividers 31 to 34 have waveforms with the change point at the same location. At this point, if the dividing ratio setting signals 12 and 13 change as shown in FIG. 5, the output clock 11 from the switching circuit 40 is switched to the output clock from the divider 31, or the clock representing ½ of the basic clock, by the operation of the switching circuit 40 when all input clock signals from the dividers 31 to 34 are at the L level and the basic clock 10 rises to the H level. Supposing that the output signals from the dividers 31 and 34 have the same change point, the cycle ts1 immediately after switching of the output clock 11 by the switching circuit 40 can be made substantially the same as the cycle ts0 of the output signal from the divider 31, which assures stable switching of clocks. Switching of dividing ratio from 1/16 to ½ of the basic clock has been described here, but stable dividing clocks can be obtained for other switching of dividing ratios.

FIG. 5 shows a timing chart of a case where the dividing ratio is switched from 1/16 to ½ of the basic clock when a phase synchronization circuit 20 of this embodiment is not provided. A conventional variable clock dividing circuit was not provided with a phase synchronization circuit as in this embodiment. In such a circuit, the output from a divider at a certain stage is continuously provided to the input terminal of the next stage divider, the change point of the output clock from a divider becomes later and later for dividers at higher stages. For this reason, as shown in FIG. 5, when switching the dividing ratio from 1/16 to ½ using the dividing ratio setting signals 12 and 13, the output signal 11 from the dividing circuit has temporarily a small L level width and tf1 becomes smaller than tf0 (where tf0 is the cycle of the output clock from the divider 31 and tf1 is the cycle of the output clock 11 from the dividing circuit immediately after switching). This results in excess of the guaranteed operation frequency by the output clock 11 of the dividing circuit, which may cause malfunction of the system.

In contrast, the variable clock dividing circuit of this embodiment as described above, the cycle ts1 immediately after switching of the output clock 11 from the switching circuit 40 can be made substantially the same as the cycle ts0 of the output signal from the divider 31, which enables stable clock switching. This assures prevention of system malfunction due to excess of the guaranteed operation frequency by the output clock 11 of the dividing circuit.

Figure 6:
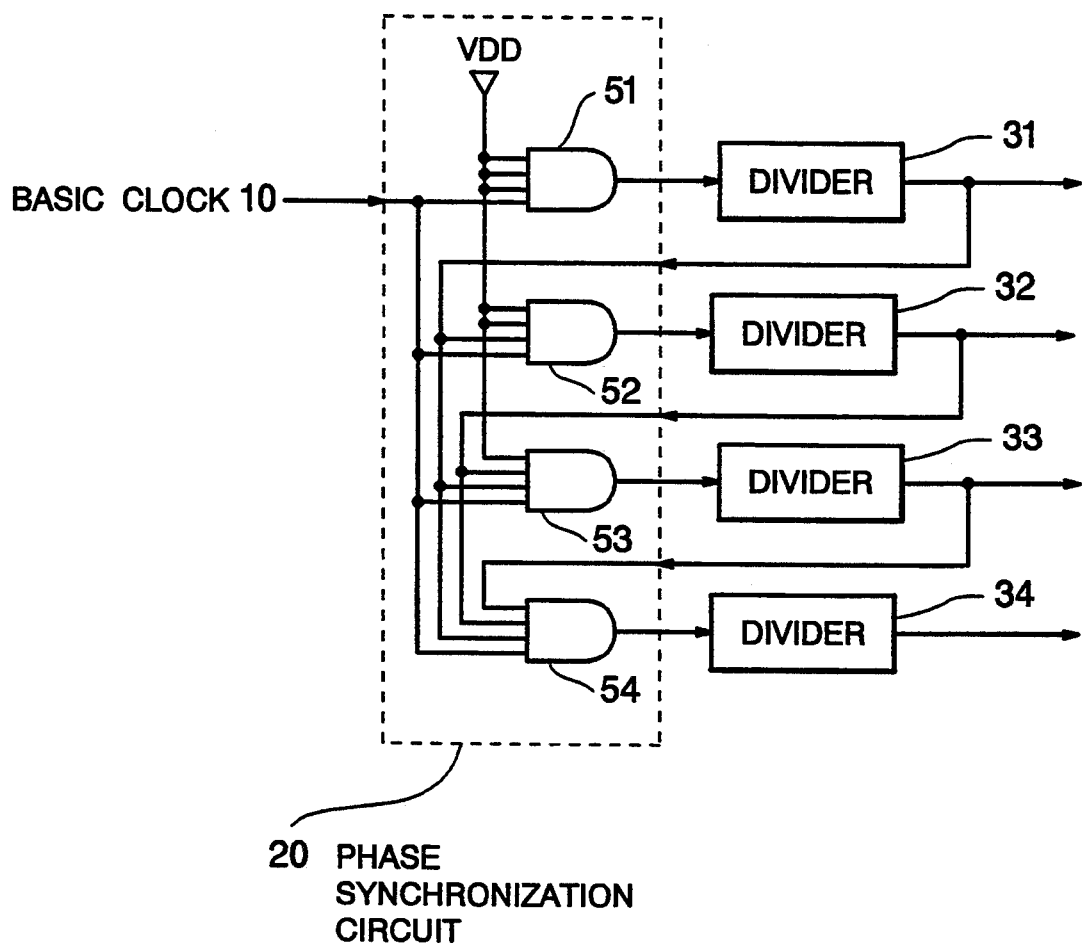
FIG. 6 is a schematic diagram to show a second embodiment of the phase synchronization circuit according to the present invention.

Next, referring to FIG. 6, a second embodiment of the phase synchronization circuit 20 is described. In FIG. 6, the configuration of the phase synchronization circuit 20 and dividers 31 to 34 only are shown, but this embodiment uses a switching circuit 40, with the same configuration as shown in FIG. 1. In this embodiment, the phase synchronization circuit 20 comprises AND gates 51 to 54 instead of the buffer 21 and the AND gates 22 to 24. The AND gates 51 to 54 have the same structure having four input gates respectively. VDD in the figure indicates a positive power supply. For the AND gate 51, the basic clock 10 is input to one of the input gates and the positive power VDD is input to the remaining three input gates. For the AND gate 52, the basic clock 10 is given to an input gate, the output clock from the divider 31 to another, and the positive power VDD to the remaining two input gates. For the AND gate 53, the basic clock 10 is input to an input gate, the output clock from the divider 31 to another, that from the divider 32 to still another, and the positive power VDD to the remaining input gate. For the AND gate 54, the basic clock 10 is input to an input gate, and the output clocks from the dividers 31 to 33 are respectively input to the remaining three input gates. The AND gates 51 to 54 provided with the same number of input gates can be made to have the same structure, which improves balance of driving capacity of the devices, resulting in more precise equalization of delay values at the devices. Thus, the clock signals input to the dividers 31 to 34 can be more precisely synchronized than in the embodiment as shown in FIG. 1.

The variable clock dividing circuit is capable of stably supplying clocks with extremely little disturbance of frequency even at the time of switching of clock dividing ratio by synchronizing the output signals from the dividers. Particularly when many dividers are used, or the basic clock has a high frequency, use of this circuit may be quite effective.

Obviously, many variations and modifications can be made to the embodiments described above. For example, the above embodiment has four dividers, but there may be any number of dividers provided that there are more than one. It is intended to cover in the appended claims all such variations and modifications as fall within the true spirit and scope of the present invention.

What is claimed is:

1. A variable clock dividing circuit comprising:
    a plurality of dividing means, coupled in succession, for cooperating to divide an input clock signal by a dividing ratio, said input clock signal being based on a basic clock signal, each of said dividing means outputting an output clock signal based on said input clock signal, clock signals being input to each of said dividing means except a first of said plurality of dividing means being based on said output clock signals of all previous dividing means in said succession;
    synchronizing means for synchronizing, based on said basic clock signal, phases of said clock signals being input to said plurality of dividing means except said first of said plurality of dividing means; and
    switching means for selectively outputting one of said output clock signals output from said plurality of dividing means.

2. A variable clock dividing circuit of claim 1, wherein said synchronizing means comprises a plurality of AND gates, each corresponding to one of said dividing means, said basic clock signal and said output clock signals from all but one of said dividing means being input to said plurality of AND gates.

3. A variable clock dividing circuit of claim 1, wherein said synchronizing means comprises a plurality of AND gates, each corresponding to one of said dividing means and having an equal number of input terminals, said basic clock signal, said output clock signals from all but one of said dividing means and a positive power voltage being input to said plurality of AND gates.

4. A variable clock dividing circuit of claim 3, wherein the number of input terminals in said AND gates is equal to the number of dividing means.

5. A variable clock dividing circuit as claimed in claim 1, wherein each of said dividing means except said first of said plurality of dividing means divides said clock signal being input thereto by one of predetermined dividing ratios, and said first of said plurality of dividing means divides said input clock signal by another of said predetermined dividing ratios.

6. A variable clock dividing circuit as claimed in claim 5, wherein each of said predetermined dividing ratios are equal.

7. A variable clock dividing circuit comprising:
    a plurality of dividing means for dividing a basic clock signal by a predetermined dividing ratio, each of said dividing means outputting an output clock signal, a first of said dividing means dividing said basic clock signal by a first predetermined dividing ratio and an n-th of said dividing means inputting said output clock signal output from an (n-1)th of said dividing means;
    synchronization means for synchronizing phases of clock signals being input to said plurality of dividing means based on said basic clock signal; and
    switching means for selectively outputting one of said output clock signals output from said plurality of dividing means.

8. A variable clock dividing circuit of claim 7, wherein said synchronizing means comprises:
    buffer means for delaying said basic clock before inputting said basic clock to said first dividing means; and
    a plurality of AND gates, each corresponding to one of said second to n-th dividing means, said plurality of AND gates receiving said basic clock and said output clock signals from all but one of said dividing means.

9. A variable clock dividing circuit of claim 8, wherein said buffer means and said plurality of AND gates impose an equal delay on signals input thereto.

10. A variable clock dividing circuit of claim 7, wherein said synchronizing means comprises a plurality of AND gates, each corresponding to one of said dividing means and having an equal number of input terminals, said basic clock signal, said output clock signals from all but one of said dividing means and a positive power voltage being input to said plurality of AND gates.

11. A variable clock dividing circuit of claim 10, wherein the number of input terminals at said AND gates equals as the number of dividing means.

* * * * *